United States Patent Office 2,972,513
Patented Feb. 21, 1961

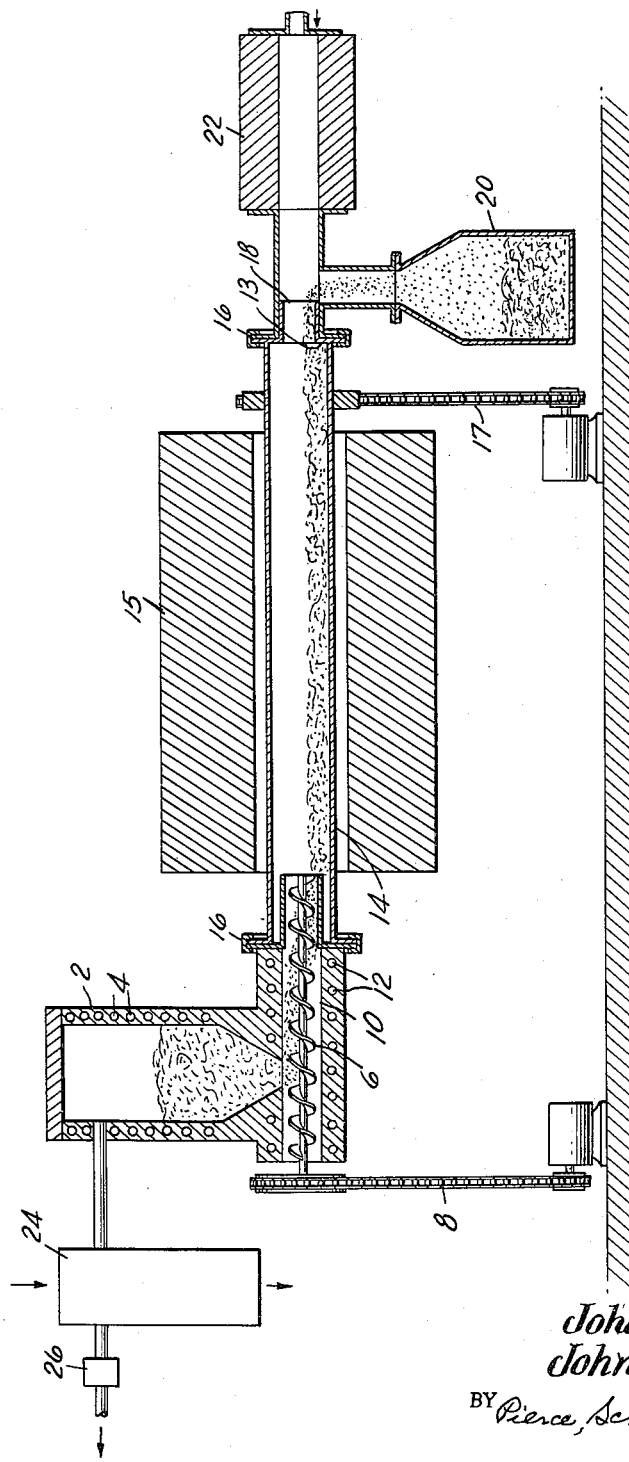

2,972,513
PROCESS FOR THE PRODUCTION OF ANHYDROUS FLUORIDES

Johan Hilding Mogard, Lidingo, and Siver John Svensson, Bromma, Sweden, assignors to Aktiebolaget Atomenergi, Stockholm, Sweden Filed Jan. 8, 1957, Ser. No. 633,062

Claims priority, application Great Britain Jan. 13, 1956

9 Claims. (Cl. 23—14.5)

This invention relates to a continuous process for the production of anhydrous fluorides by the treatment of oxides with hydrofluoric acid, or gas mixtures containing such acid, at elevated temperature, the oxides being conducted counterflow to the hydrofluoric acid in an elongated reaction vessel. The invention relates especially to the production of fluorides of the so-called actinides, and more particularly of uranium tetrafluoride and thorium tetrafluoride. The invention is of considerable significance as regards the production of anhydrous fluorides of those elements which are capable of forming fluoride hydrates.

The conversion of metallic oxides to fluorides by means of gases containing hydrofluoric acid is very old. Its technical use, however, is attended by certain difficulties, which reside above all in the activity of the fluorous gases at high temperature and in the difficulty in selecting suitable materials which not only withstand the chemical action but also at the same time the thermal load.

More recently the fluoration process for the production of uranium tetrafluoride from uranium dioxide has acquired an enhanced importance, and there have been employed reaction vessels, for example revolving tubular furnaces, which consist wholly of magnesium or at least are lined with magnesium at those points which come into contact with gaseous fluorine compounds. Owing to the sensitivity of magnesium to fluorous gases in the presence of water, particular care is taken to ensure that operations are carried out at temperatures which are situated well above the dew point of the resulting mixture of water and hydrofluoric acid. It has been found, however, that in these processes only a comparatively low rate of reaction is achieved and that the hydrofluoric acid is utilised only incompletely. Those are disadvantages which make themselves very noticeable when carrying out the known process in continuous operation, and they apply not only to the production of uranium tetrafluoride but also to the fluoration of numerous other metals in which anhydrous fluoride is formed only slowly and incompletely.

It has now been found that, as regards continuous conversion of metallic oxides by means of hydrofluoric acid and the desired rapidity and completeness of the reaction, the form in which the fluorides are initially obtained is of fundamental importance. It has been ascertained that, in the case of those elements which are capable of forming fluoride hydrates, i.e. fluorides which contain water of crystallization, formation of the hydrate takes place at a considerably greater speed than in the case of fluorides which contain no combined water, and that the available hydrofluoric acid is far greater utilised. According to the invention, therefore, anhydrous fluorides of those elements which are at all capable of forming fluoride hydrates from the corresponding oxides are continuously produced by first converting the oxides to fluoride hydrates and then converting the latter to anhydrous fluorides in the same reaction vessel.

In carrying the invention into practice the procedure is such that, in contradistinction to the known process, an even reaction temperature is not maintained along the reaction vessel but provision is made for a progressively increasing temperature in the direction of movement of the solid material. At the inlet end as regards the oxide and in the adjoining part of the reaction vessel temperatures are accordingly maintained which are above the dew point of the mixture formed by the hydrofluoric acid and water but which do not exceed the value above which fluorides containing combined water are no longer able to exist in any appreciable amount. On the other hand there are employed in the part of the reaction vessel adjacent the outlet end for the fluoride temperatures at which there occurs a dehydration of the fluoride containing combined water and formed in the other section of the reaction chamber. As regards the conversion to fluorides temperatures between 150° and 250° are advantageous, and as regards dehydration temperatures above 300° and preferably between 350° and 550° are used.

The process according to the invention may be employed with advantage fundamentally for the fluoration of all elements which are capable of forming fluorides containing combined water; it is, however, of significance only as regards those non-volatile or little volatile fluorides which, upon heating, for example to dehydration temperature, tend towards hydrolytic decomposition. Amongst the fluorides which may be produced in anhydrous condition on a technical scale by the use of the present process reference may be made, for example, to the fluorides of the elements of the lanthanide group, and above all to the trivalent and quadrivalent fluorides of the metals of the actinide group, particularly uranium tetrafluoride and thorium tetrafluoride, which is isomorphous and is also very similar thereto in all other respects.

The process according to the invention may be carried out in the usual manner in a revolving tubular furnace, in which case attention must be paid to a reliable fluorine-resistant sealing of the moving parts. In view of the difficulty in dealing with hydrofluoric acid it has been found, however, to be of advantage to carry out the process in a stationary reaction vessel, in which accordingly no moving parts require to be sealed, and to effect conveyance of the material through the reaction zone by means of periodic impulses. In this case use may be made of known vibratory conveying means, in which the reaction vessel, or a base located therein for the solid material, is subjected to periodic vibrations which may be produced mechanically, magnetically or electrically. Where the reaction is carried out in a stationary vessel it is of advantage to employ, in place of a tubular reaction vessel, a vessel which has a rectangular cross-section of which the width considerably exceeds the height. In this way the material traverses the reaction zone in the form of a thin layer and the oxide or the fluoride to be dehydrated enters into intimate contact with the gaseous medium.

Owing to the high utilisation of the hydrofluoric acid brought about by the initial formation of hydrated fluoride it is possible to cause the hydrofluoric acid to act on the oxide in admixture with other gases which are inert thereto and to the fluoride formed. Thus, for example, hydrogen is a suitable diluent.

In order to avoid the danger of temporary condensation of moisture from the gaseous or vapor reaction products and to improve the thermal economy of the process the oxide, in accordance with another favourable embodiment, may be introduced into the reaction vessel in a preheated condition. The temperature to which the oxide is preheated should at least correspond to the dew point of the gaseous or vaporous reaction products. It may also be desirable to preheat the gas which contains the hydrofluoric acid, for example to a temperature of 80° and the preheating may take place in vessels which consist of magnesium or are lined with that metal. The reaction vessel itself, in known manner, will be made of magnesium or of alloys which are rich in magnesium, or will at least be lined with such materials at those points which come into contact with hydrofluoric acid at elevated temperature. The thickness of the lining should be at least 2 mm.

Instead of magnesium, aluminium or alloys rich in aluminium may be used for the reaction vessel or lining therefor and, if desired, for the preheating means.

For the production of uranium tetrafluoride from uranium dioxide by the process according to the invention it has been found very suitable to use as regards a rapid development of the reaction uranium dioxide which has been produced by the thermal decomposition of uranyl oxalate at elevated temperature in the absence of oxidising gases. In this way there is obtained particularly readily a nuclear pure uranium tetrafluoride.

The uranium product which is obtained in accordance with the specification of our French Patent No. 1,129,887, and which is produced by hydrolytic precipitation from a solution of hexavalent uranium in the presence of acid amides, such as carbamide (urea) and acetamide, is also very suitable for the purpose of the present process. This product flows very evenly and is very readily fluorated so that the treatment proceeds comparatively quickly.

An example illustrating the invention will now be given with reference to the accompanying drawing which diagrammatically illustrates apparatus suitable for carrying out the invention.

A quantity of about 20 kilograms of uranium dioxide is charged into the container 2 in which it is then preheated to about 150° C. by the heating element 4. A feed screw 6 driven by the device 8 feeds the uranium dioxide through a tube 10, which is also heated to 150° C. by the heating element 12, to the reaction vessel 14, the feed velocity being about 2 kilograms uranium dioxide per hour. The reaction vessel 14, which is rotated by means of the device 17, is cylindrical and is lined with a magnesium tube having a wall thickness of 5 millimeters and an inner diameter of 110 millimeters and a length of 300 centimeters. The reaction vessel is provided at its exit end with a choke disc 13 having an opening with a diameter of 60 millimeters. The reaction vessel 14 is heated by the furnace 15 to a temperature of about 500° C. Means 16 are provided at both ends of the reaction vessel to render it gas-tight and these means are resistant to hydrogen fluoride. The furnace tube 14 slopes at about 3° relatively to the horizontal plane and is rotated by means of the driving device 17 at such a rate that the rate of movement of the solids towards the exit end of the sloping tube 14 is equal to the feed velocity of the feed screw 6. The reaction product, the uranium tetrafluoride, passes through the choke disc 13 and an extension tube 18 to a collecting vessel 20.

The hydrogen fluoride gas supplied to the reaction vessel in a quantity of about 20 kilograms hydrogen fluoride per hour is diluted with about 10 percent by volume of hydrogen. The gas mixture is preheated in a magnesium lined furnace 22 to about 300° C. and then passes over the solids in the rotating furnace tube 14 in counterflow. The reaction between the uranium dioxide and the hydrogen fluoride gas forms water vapour which constitutes a portion of the gas containing hydrogen and the excess hydrogen fluoride leaving the reaction vessel. This gas mixture is passed from the reaction vessel 14 through the tube 10 and the charge of uranium dioxide in the container 2 to a washing tower 24. The hydrogen fluoride is there neutralized with sodium hydroxide solution which is sprayed in the form of comminuted drops through the slowly flowing gas mixture. The residual gas, the hydrogen, leaves the tower 24 through a water trap 26 which is so regulated that a super-atmospheric pressure of about 50 millimeters water column is obtained in the washing tower 24.

The uranium tetrafluoride produced contains less than 0.5% of each of uranyl fluoride and uranium dioxide.

What we claim is:

1. Process for the continuous production of an anhydrous fluoride of a metal selected from the lanthanide and actinide groups from an oxide of such metal in an elongated reaction zone having an inlet end and an outlet end, in which process said oxide is introduced into said zone at the inlet end thereof and hydrogen fluoride is introduced into said zone at the outlet end thereof, passing said oxide and said hydrogen fluoride countercurrently through said zone at a temperature causing said hydrogen fluoride to react with said oxide to form a fluoride of said metal and water, maintaining in said zone a progressively increasing temperature from a temperature in the region adjacent said inlet end above the dew point of the gaseous mixture containing hydrogen fluoride and water in said region and below the decomposition temperature of the fluoride hydrate of said metal to a temperature at said outlet end of from 300° C. to 550° C., and extracting at said outlet end an anhydrous fluoride of said metal.

2. Process according to claim 1, wherein an elongated reaction vessel is employed, the width of which is greater than its height and wherein the oxide and fluoride are passed through the reaction zone in the form of a relatively thin layer and the hydrogen fluoride is passed over such layer in the form of a shallow stream.

3. Process according to claim 1, wherein the hydrofluoric acid is employed in mixture with a gas which is inert as regards the oxide and fluoride.

4. Process according to claim 1, wherein the hydrofluoric acid introduced into the reaction vessel is preheated to a temperature of at least 80°.

5. Process as defined in claim 1 for the production of anhydrous uranium tetrafluoride, wherein uranium dioxide is introduced into said zone.

6. Process as defined in claim 1 in which uranyl oxalate is thermally decomposed so as to form uranium dioxide, which is introduced into said zone.

7. Process as defined in claim 1 in which a solution of a salt of hexavalent uranium and an amide of the group consisting of carbamide and acetamide is heated until uranium is precipitated in the form of oxide, and the uranium oxide precipitation is dried, preheated and introduced into said zone.

8. Process as defined in claim 1 in which the temperature in said region near the inlet is between 150° C. and 250° C.

9. Process for the continuous production of an anhydrous fluoride of a metal of the group consisting of uranium and thorium from an oxide of such metal in an elongated reaction zone having an inlet end and an outlet end, in which process said oxide is introduced into said zone at the inlet end thereof and hydrogen fluoride is introduced into said zone at the outlet end thereof, passing said oxide and said hydrogen fluoride countercurrently through said zone at a temperature causing said hydrogen fluoride to react with said oxide to form a fluoride of said metal and water, maintaining in said zone a progressively increasing temperature from a temperature in the region adjacent said inlet end above the dew point of the gaseous mixture containing hydrogen fluoride and water in said region and below the decomposition temperature of the fluoride hydrate of said metal to a temperature at said outlet end of from 300° C. to 550° C., and extracting at said outlet end an anhydrous fluoride of said metal.

References Cited in the file of this patent

UNITED STATES PATENTS

| | | |
|---|---|---|
| 1,272,375 | Burns | July 16, 1918 |
| 2,023,942 | Wescott | Dec. 10, 1935 |
| 2,674,518 | Evers et al. | Apr. 6, 1954 |
| 2,689,165 | Harvey | Sept. 14, 1954 |
| 2,752,301 | Cooper | June 26, 1956 |
| 2,811,414 | Murphree | Oct. 29, 1957 |

OTHER REFERENCES

Katz et al.: The Chemistry of Uranium, pp. 355–365 (1951). Published by McGraw-Hill Co., N.Y. Copy in Sci. Lib.